United States Patent
Tsao et al.

(10) Patent No.: US 7,197,588 B2
(45) Date of Patent: Mar. 27, 2007

(54) INTERRUPT SCHEME FOR AN INPUT/OUTPUT DEVICE

(75) Inventors: Gary Y. Tsao, Austin, TX (US); Hemal V. Shah, Austin, TX (US); Gregory D. Cummings, Portland, OR (US)

(73) Assignee: Intel Corporation, Santa Clara, CA (US)

(*) Notice: Subject to any disclaimer, the term of this patent is extended or adjusted under 35 U.S.C. 154(b) by 214 days.

(21) Appl. No.: 10/816,435

(22) Filed: Mar. 31, 2004

(65) Prior Publication Data
US 2005/0228922 A1 Oct. 13, 2005

(51) Int. Cl.
*G06F 13/24* (2006.01)
*G06F 13/42* (2006.01)
*G06F 9/46* (2006.01)

(52) U.S. Cl. .................... 710/268; 710/267
(58) Field of Classification Search ........ 710/260–269, 710/48, 50, 73; 719/318; 709/253; 712/25
See application file for complete search history.

(56) References Cited

U.S. PATENT DOCUMENTS

| | | | |
|---|---|---|---|
| 5,214,759 A * | 5/1993 | Yamaoka et al. ........... 709/213 |
| 5,471,618 A * | 11/1995 | Isfeld ........................... 710/19 |
| 5,557,744 A * | 9/1996 | Kobayakawa et al. ...... 709/232 |
| 5,564,005 A * | 10/1996 | Weber et al. ............... 715/863 |
| 5,566,337 A * | 10/1996 | Szymanski et al. ......... 710/260 |
| 6,760,783 B1 | 7/2004 | Berry |
| 6,792,483 B2 * | 9/2004 | Schmidt ....................... 710/48 |
| 6,804,631 B2 * | 10/2004 | Kelley et al. ............... 702/187 |
| 7,010,633 B2 | 3/2006 | Arndt et al. |
| 2001/0037397 A1 | 11/2001 | Boucher et al. |
| 2002/0152327 A1 | 10/2002 | Kagan et al. |
| 2003/0065856 A1 | 4/2003 | Kagan et al. |
| 2004/0017819 A1 | 1/2004 | Kagan et al. |
| 2004/0027374 A1 | 2/2004 | Cime et al. |
| 2004/0103225 A1 | 5/2004 | McAlpine et al. |
| 2004/0237093 A1 * | 11/2004 | Sluiman et al. ............. 719/318 |
| 2005/0228920 A1 * | 10/2005 | Shah et al. |
| 2005/0228922 A1 | 10/2005 | Tsao et al. |
| 2006/0004983 A1 | 1/2006 | Tsao et al. |
| 2006/0133396 A1 | 6/2006 | Shah et al. |
| 2006/0149919 A1 | 7/2006 | Arizpe et al. |

OTHER PUBLICATIONS

"GTO driving and protection technique with status monitoring" by Salzmann et al. (abstract only) Publication Date: Jan.-Feb. 1988.*

(Continued)

*Primary Examiner*—Gopal C. Ray
(74) *Attorney, Agent, or Firm*—Janaki K. Davda; Konrad Raynes & Victor LLP

(57) ABSTRACT

Provided are techniques for interrupt processing. An Input/Output device determines that an event has occurred. The Input/Output device determines a processor identifier and determines an event data structure identifier for an event data structure into which event data for the event is stored using the processor identifier. The Input/Output device also determines a vector identifier for an interrupt message vector into which an interrupt message for the event is written. Then, interrupt message data is written to the interrupt message vector to generate an interrupt.

24 Claims, 16 Drawing Sheets

OTHER PUBLICATIONS

"Utilization of time varying event-based customer interruption cost load shedding schemes" by Wangdee et al. (abstract only) Publication Date: Sep. 12-16, 2004.*

U.S. Appl. No. 11/106,824, filed Apr. 15, 2005.

IEEE Standard for Information Technology 802.3, Part 3: Carrier Sense Multiple Access with Collision Detection (CSMA/CD) Access Method and Physical Layer Specifications; Institute of Electrical and Electronics Engineers, Inc., Mar. 8, 2002; 33 pp.

IEEE Std. 802. 11b-1999, "Wireless LAN Medium Access Control (MAC) and Physical Layer (PHY) Specifications . . .," Institute of Electrical and Electronics Engineers, Inc., Sep. 16, 1999; 17 pp.

PCI Local Bus Specification Rev. 2.3: PCI Engineering Change Notice—MSI-X, Jun. 10, 2003; Summary pp. 1-2; Chapter 6, "Configuration Space," pp. 189-209.

PCI Specifications, PCI-SIG 2004; web pages including Mar. 20, 2002 news release "PCI-SIG Releases New PCI Version 2.3 Local Bus Specification for Migration to Low-Voltage Designs," 18 pp. Available from the Internet at <URL: http://www.pcisig.com>.

Weber, et al., "Fibre Channel (FC) Frame Encapsulation," Network Working Group, RFC:3643, Dec. 2003; 17 pp.

Culley, et al. "Marker PDU Aligned Framing for TCP Specification (Version 1.0)," Release Specification of the RDMA Consortium; Oct. 25, 2002; 32 pp.

Hilland, et al. "RDMA Protocol Verbs Specification (Version 1.0)," Release Specification of the RDMA Consortium; Apr. 2003; 243 pp.

Recio, et al. "An RDMA Protocol Specification (Version 1.0)," Release Specification of the RDMA Consortium; Oct. 2002; 60 pp.

Shah, et al. "Direct Data Placement over Reliable Transports (Version 1.0)," Release Specification of the RDMA Consortium; Oct. 2002; 35 pp.

Anderson, Don, et al., eds. "PCI System Architecture," 4th ed.; TOC pp. v-xiii; Intro. pp. 1-6; Chapter 1 pp. 7-13; Chapter 2 pp. 15-21; 1999.

Window Platform Design Notes, "Interrupt Architecture Enhancements in Microsoft Windows . . .," © 2003 Microsoft Corporation; 42 pp.

Buonadonna, P., and D. Culler, "Queue Pair IP: A Hybrid Architecture for System Area Networks", Proceedings of the 29th Annual International Symposium on Computer Architecture, 2002, pp. 247-256.

Deyring, K. (Ed.), "Serial ATA: High Speed Serialized AT Attachment", Rev. 1.0, Aug. 29, 2001, 36 pp.

Infiniband, "InfiniBand Architecture Specification vol. 1", Release 1.0, Oct. 24, 2000, Ch. 1-8, pp. 1-195.

Infiniband, "InfiniBand Architecture Specification vol. 1", Release 1.0, Oct. 24, 2000, Ch. 9-10, pp. 196-445.

Infiniband, "InfiniBand Architecture Specification vol. 1", Release 1.0, Oct. 24, 2000, Ch. 11-14, pp. 446-669.

Infiniband, "InfiniBand Architecture Specification vol. 1", Release 1.0, Oct. 24, 2000, Ch. 15-20, pp. 670-880.

Infiniband, "InfiniBand Architecture Specification vol. 2", Release 1.0, Oct. 24, 2000, Ch. 1-11, pp. 1-319.

Infiniband, "InfiniBand Architecture Specification vol. 2", Release 1.0, Oct. 24, 2000, Ch. 12-Appendix D, pp. 320-623.

EP Office Action, Feb. 9, 2006, for International Application No. 03 812 441.8-22111.

PCT International Search Report, Aug. 9, 2004, for International Application No. PCT/US03/37254.

Penokie, G.O.(Ed.), "Information Technology-SCSI Controller Commands-2 (SCC-2)", T10/Project 1225D, Revision 4, Sep. 12, 1997, 24 pp.

Rangarajan, M., A. Bohra, K. Banerjee, E.V. Carrera, and R. Bianchini, "TCP Servers: Offloading TCP Processing in Internet Servers. Design, Implementation, and Performance", Technical Report, Rutgers University, 2002, pp. 1-14.

RDMA Consortium, "Architectural Specifications for RDMA over TCP/IP", [online], 2005, [retrieved on Dec. 22, 2005], retrieved from the Internet at <URL: http://www.rdmaconsortium.org/home>.

Stevens, R.W., "UNIX Network Programming", 1990, pp. 209-210.

US Final Office Action, May 24, 2006, for US Appl. No. 10/815,902.

US First Office Action, Dec. 13, 2005, for U.S. Appl. No. 10/815,902.

"Virtual Interface Architecture Specification", Draft Revision 1.0, Dec. 4, 1997, 83 pp.

* cited by examiner

| Function/ Event Code | Processor 0 | | Processor 1 | Processor 2 | • • • | Processor N |
|---|---|---|---|---|---|---|
| | Event Data Structure Identifier | Vector Identifier | | | | |
| RDMA | | | | | | |
| Channel | • • • | • • • | | | | |
| Global | • • • | • • • | | | | |
| MGMT trap | • • • | • • • | | | | |

Message Vector Mapping Structure

FIG. 7

| Function/ Event Code | Processor 0 | | Processor 1 | Processor 2 | ••• | Processor N |
|---|---|---|---|---|---|---|
| RDMA TX | Event Data Structure Identifier | Vector Identifier | | | | |
| RDMA RX | Event Data Structure Identifier | Vector Identifier | | | | |
| Channel TX | ••• | ••• | | | | |
| Channel RX | ••• | ••• | | | | |
| Global – General Purpose I/O (GPIO) Interrupts | ••• | ••• | | | | |
| Global – Errors | ••• | ••• | | | | |
| MGMT trap | ••• | ••• | | | | |

Message Vector Mapping Structure

FIG. 8

INTERRUPT SCHEME FOR AN INPUT/OUTPUT DEVICE

BACKGROUND

In conventional systems, Input/Output (I/O) devices use interrupts to notify a host stack of various events, such as transmit/receive completions. An interrupt may be described as a signal from a device attached to a computer or from a program executing on the computer that causes the operating system of the computer to stop current processing and handle the interrupt. An I/O device may be described as a device that is part of a host system and that is attached to an I/O fabric. The host system uses I/O devices in performing I/O operations (e.g., network I/O operations, storage I/O operations, etc.). A host stack may be described as software that includes applications, libraries, drivers, and an operating system that run on host processors (Central Processing Units or "CPUs") of a host system.

In some systems, upon an interrupt from an I/O device, an I/O device driver executing at the host system runs an Interrupt Service Routine (ISR) that checks the state of an I/O device interrupt for each I/O device, one at a time. Then, if a particular I/O device generated the interrupt, the ISR disables interrupts so that the same I/O device cannot generate another interrupt, acknowledges the interrupt, processes the interrupt, and enables interrupts so that the I/O device can generate another interrupt. Typically, an I/O device has registers for interrupt status/cause, masking, and acknowledgement. Thus, the ISR performs an I/O read of the register across a bus for interrupt status/cause to determine whether a particular I/O device generated the interrupt and to determine the type of interrupt. The ISR performs I/O writes across the bus to the register for masking to disable and enable the interrupts. Additionally, the ISR performs an I/O write across the bus to the register for acknowledgement to acknowledge the interrupt. I/O reads and I/O writes go across the bus connecting the I/O device to the host system. Such I/O reads and I/O writes across the bus for interrupt processing may degrade system performance and result in interrupt processing latency and system overhead. Also, the I/O reads and I/O writes may be Memory Mapped I/O (MMIO) reads/writes.

In conventional systems, interrupt processing related overhead to processor is not scalable with processor speed due, for example, to memory mapped IO (MMIO) reads/writes and context switches. Additionally, efficient load balancing of interrupts across multiple processors in a multiprocessor system, especially for packet receive processing in standard operating systems, has become a focus point lately. The impact of interrupts for high performance devices, such as 10 G Transmission Control Protocol (TCP) Offload Engine (TOE)/Remote Direct Memory Access (RDMA) Network Interface Controller (RNIC), also causes problems.

Notwithstanding conventional techniques for interrupt processing, there is a need in the art for improved interrupt processing.

BRIEF DESCRIPTION OF THE DRAWINGS

Referring now to the drawings in which like reference numbers represent corresponding parts throughout:

FIG. 7 illustrates an example Message Vector Mapping (MVM) structure in accordance with certain embodiments.

FIG. 8 illustrates an alternative example Message Vector Mapping (MVM) structure in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made.

Embodiments describe a multi event data structure based interrupt processing scheme for I/O devices, such as high performance I/O devices, that alleviates the interrupt impact to system performance. The multi event data structure based scheme may be used by any I/O device to communicate events with the host stack. In certain embodiments, the event data structures are event queues, thus, in certain embodiments, a multi event queue based interrupt scheme is provided.

Figure 1:
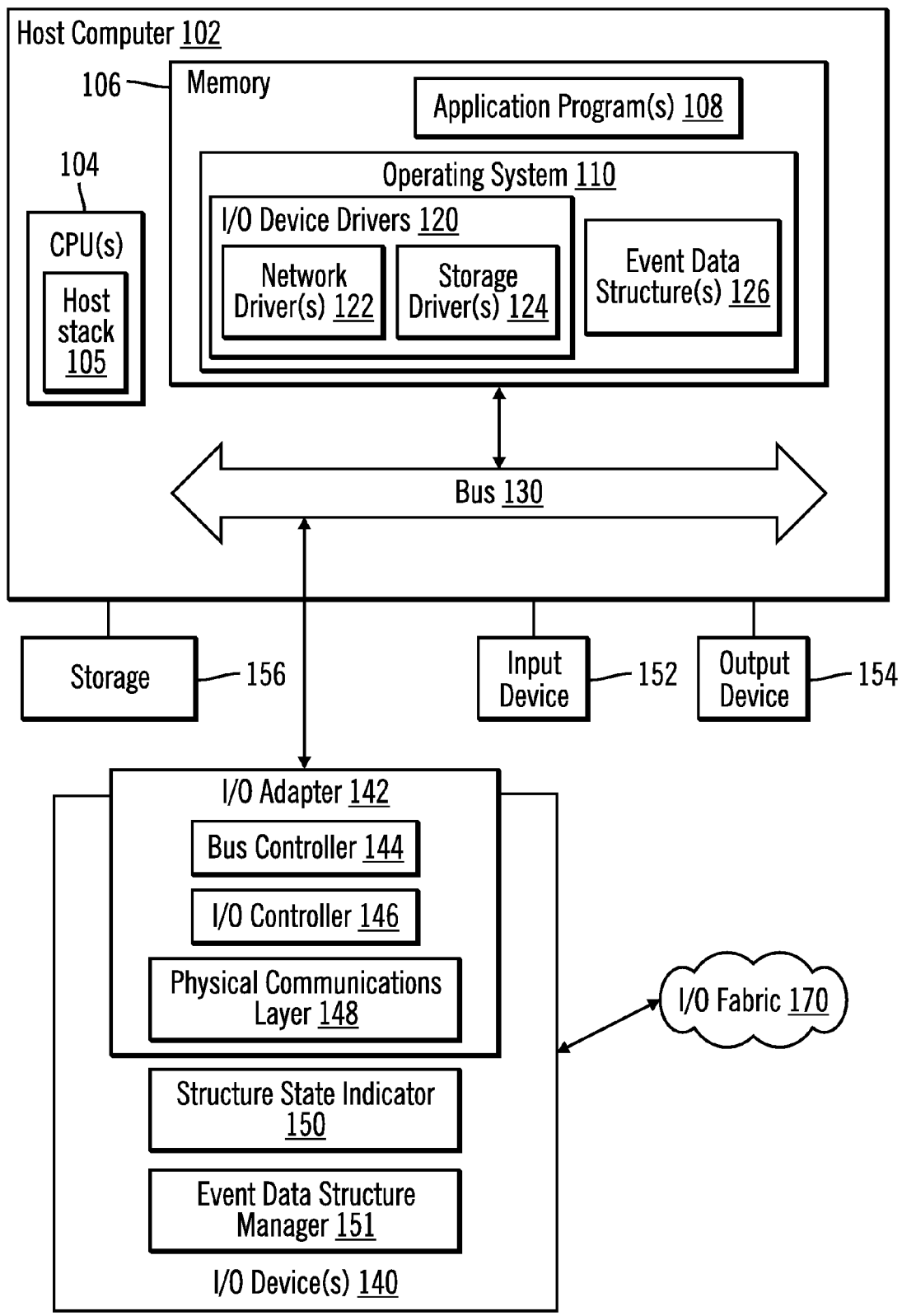
FIG. 1 illustrates computer system in accordance with certain embodiments.

FIG. 1 illustrates a computing environment in which embodiments may be implemented. A host computer 102 is connected to one or more I/O devices 140 via a bus 130. Any number of I/O devices may be attached to host computer 102.

Host computer 102 includes one or more central processing units (CPUs) 104, a volatile memory 106, non-volatile storage 156 (e.g., magnetic disk drives, optical disk drives, a tape drive, etc.), and one or more I/O devices 140. A host stack 105 executes on at least one CPU 104.

One or more application programs 108 and an operating system 110 reside in memory 106 and execute on one or more CPUs 104. Operating system 110 includes I/O device drivers 120. The I/O device drivers 120 include one or more network drivers 122 and one or more storage drivers 124 that reside in memory 106 and execute on CPUs 104. The network drivers 122 and storage drivers 124 may be described as types of I/O device drivers 120. Also, one or more event data structures 126 are in memory 106.

The I/O device driver 120 includes I/O device specific commands to communicate with each I/O device 140 and interfaces between the operating system 110 and each I/O device 140. The I/O device 140 and I/O device drivers 120 implement logic to process I/O functions.

Each I/O device 140 includes various components implemented in the hardware of the I/O device 140. Each I/O device 140 is capable of transmitting and receiving packets of data over I/O fabric 170, which may comprise a Local Area Network (LAN), the Internet, a Wide Area Network (WAN), Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

Each I/O device 140 includes an I/O adapter 142, a structure state indicator 150, and an event data structure manager 151. In certain embodiments, an I/O adapter 142 is a Host Bus Adapter (HBA). In particular, an I/O adapter 142 includes bus controller 144, I/O controller 146, and physical communications layer 148. A bus controller 144 enables each I/O device 140 to communicate on a computer bus 130, which may comprise any bus interface known in the art, such as a Peripheral Component Interconnect (PCI) bus or PCI express bus (PCI Special Interest Group, PCI Local Bus Specification, Rev 2.3, published March 2002), etc. The I/O controller 146 implements functions used to perform I/O functions. The physical communication layer 148 implements functionality to send and receive network packets to and from remote data storages over an I/O fabric 170. In certain embodiments, the I/O adapters 142 may implement the Ethernet protocol (IEEE std. 802.3, published Mar. 8, 2002), Fibre Channel (IETF RFC 3643, published December 2003), or any other networking or storage protocol known in the art.

The I/O device 140 also includes a structure state indicator 150 (which in some embodiments may be a "doorbell register"). In certain embodiments, the structure state indicator 150 is a register.

Each I/O device 140 includes an event data structure manager 151 that is responsible for updating the appropriate event data structure 126 and performing other tasks.

The host computer 102 may comprise a computing device known in the art, such as a mainframe, server, personal computer, workstation, laptop, handheld computer, etc. Any CPU 104 and operating system 110 may be used. Programs and data in memory 106 may be swapped into and out of storage 156 as part of memory management operations. The storage 156 may comprise an internal storage device or an attached or network accessible storage. Programs in the storage 156 are loaded into the memory 106 and executed by the CPU 104. An input device 152 and an output device 154 are connected to the host computer 102. The input device 152 is used to provide user input to the CPU 104 and may be a keyboard, mouse, pen-stylus, microphone, touch sensitive display screen, or any other activation or input mechanism known in the art. The output device 154 is capable of rendering information transferred from the CPU 104, or other component, at a display monitor, printer, storage or any other output mechanism known in the art.

In certain embodiments, in addition to the I/O device drivers 120, the host computer 102 may include other drivers. The I/O devices 140 may include additional hardware logic to perform additional operations to process received packets from the host computer 102 or the I/O fabric 170. Further, the I/O devices 140 may implement a transport layer offload engine (TOE) to implement the transport protocol layer in the I/O device as opposed to the I/O device drivers 120 to further reduce host computer 102 processing burdens. Alternatively, the transport layer may be implemented in the I/O device drivers 120 or other drivers (for example, provided by an operating system).

Various structures and/or buffers (not shown) may reside in memory 106 or may be located in a storage unit separate from the memory 106 in certain embodiments.

Figure 2:
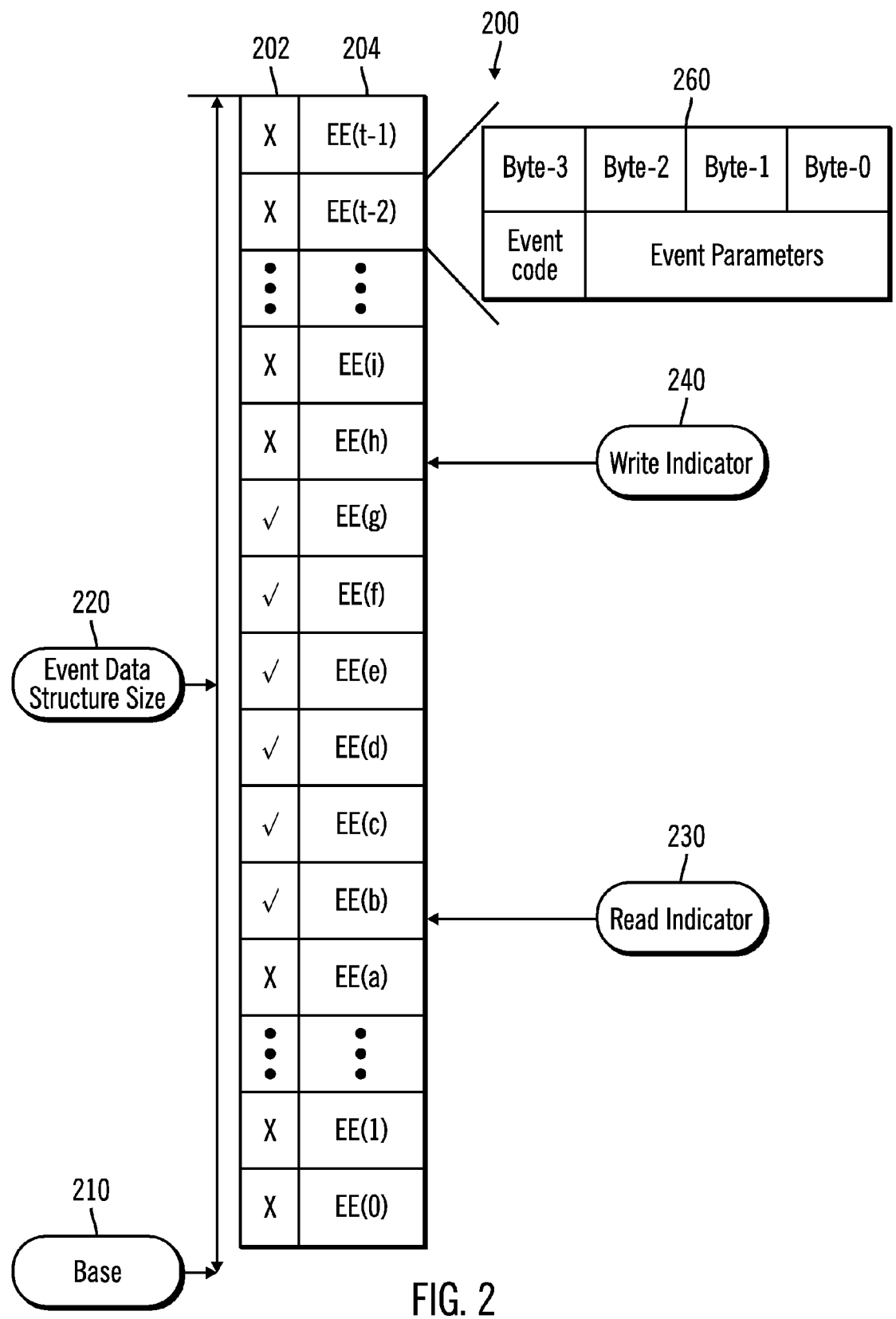
FIG. 2 illustrates an event data structure in accordance with certain embodiments.

FIG. 2 illustrates an event data structure 200 in accordance with certain embodiments. Event data structure 200 is an example of event data structures 126 (FIG. 1). One or more event data structures 200 may be shared by a host stack and an I/O device 140. Event data structures 200 are used by the I/O device 140 to communicate various events to the host stack. The event data structure 200 resides in host computer 102 memory 106. A base 210 defines a starting address of the event data structure. The size of the event data structure, in terms of event entries, is defined by the event data structure size 220.

Each element of the event data structure 200 is referred to as event entry (EE). Each event entry has an event code field 202 and event specific parameters 204. This eliminates the need for I/O reads for retrieving event information upon receipt of an interrupt. The event code identifies the interrupt source or function (e.g., a global event or a channel event). Also, the event entry may include additional information, such as read and/or write indicator values, connection context identifier, work or completion data structure identifier. The event data structure 200 may have variable event entries, and each event entry may be z-bytes in size. For example, event entry 260 illustrates an example of a 4-byte event entry in which byte-3 is used to store the event code 202, while bytes 2, 1, and 0 are used to store the event parameters 204.

The event data structure 200 is organized as a circular buffer, written by an I/O device 140 and read by an I/O device driver 120. The I/O device 140 may write entries into the event data structure 200 for various reasons, such as errors, channel events, global events, manageability events, etc. The I/O device 140 generates an interrupt depending upon the state of the event data structure 200. Initially, both the I/O device 140 and the I/O device driver 120 point to the first event entry in the event data structure 200. The I/O device 140 writes event specific information in the event entry indicated by the write indicator 240 (e.g., a pointer) and advances the write indicator 240 after writing an event entry to the event data structure 200. Similarly, when the I/O device driver 120 retrieves an event entry, the I/O device driver 120 advances the read indicator 230. In certain embodiments, the write indicator 240 and read indicator 230 values are stored in registers. In certain embodiments, the read and/or write indicators 230, 240 may be updated with "lazy" updates (i.e., at a later time than an event entry is read or written).

The event data structure 200 may be either physically contiguous or virtually contiguous. The I/O device 140 performs a virtual to physical address translation for the location indicated by the write indicator 240 when the event data structure is virtually contiguous. In certain embodiments, the event data structure may be dynamically resized.

Thus, with event data structures 126, the I/O device 140 acts as a producer, while the I/O device driver 140 acts as the consumer. When an I/O device 140 wishes to signal an interrupt, the I/O device 140 first places an event entry into an event data structure 126. The I/O device 140 also updates the write indicator, and, in some cases, sends an interrupt message (i.e., interrupt message data). For example, for Message Signal Interrupt (MSI)/MSI-X based interrupts, the I/O device 140 sends the interrupt message with an associated interrupt message vector (e.g., a location in address space), and, for PCI based interrupts, the I/O device 140 sends the interrupt message by asserting INTx#. Also, there may be "interrupt coalescing" or interrupt moderation schemes applied in the I/O device 140 before each interrupt, depending on the interrupt latency requirement. In this interrupt scheme, the interrupt service routine and post processing after the interrupt service routine at the I/O device driver 120 uses a single MMIO write to re-enable interrupts, instead of using 1 MMIO read plus up to 2 MMIO writes, as in conventional systems.

The I/O device 140 includes an event data structure manager 151 that is responsible for updating the appropriate event data structure 126, updating the write indicator 140 (lazy update), and generating the interrupt.

The I/O device 140 maintains an event data structure state, while the I/O device driver 120 controls the "to state" state transitions. These transitions are initiated by writing the desired state transition encoding to a structure state indicator 150. The structure state indicator 150 is an I/O address used by the host stack to communicate event data structure state values and read indicator values to the I/O device 140.

Figure 3:
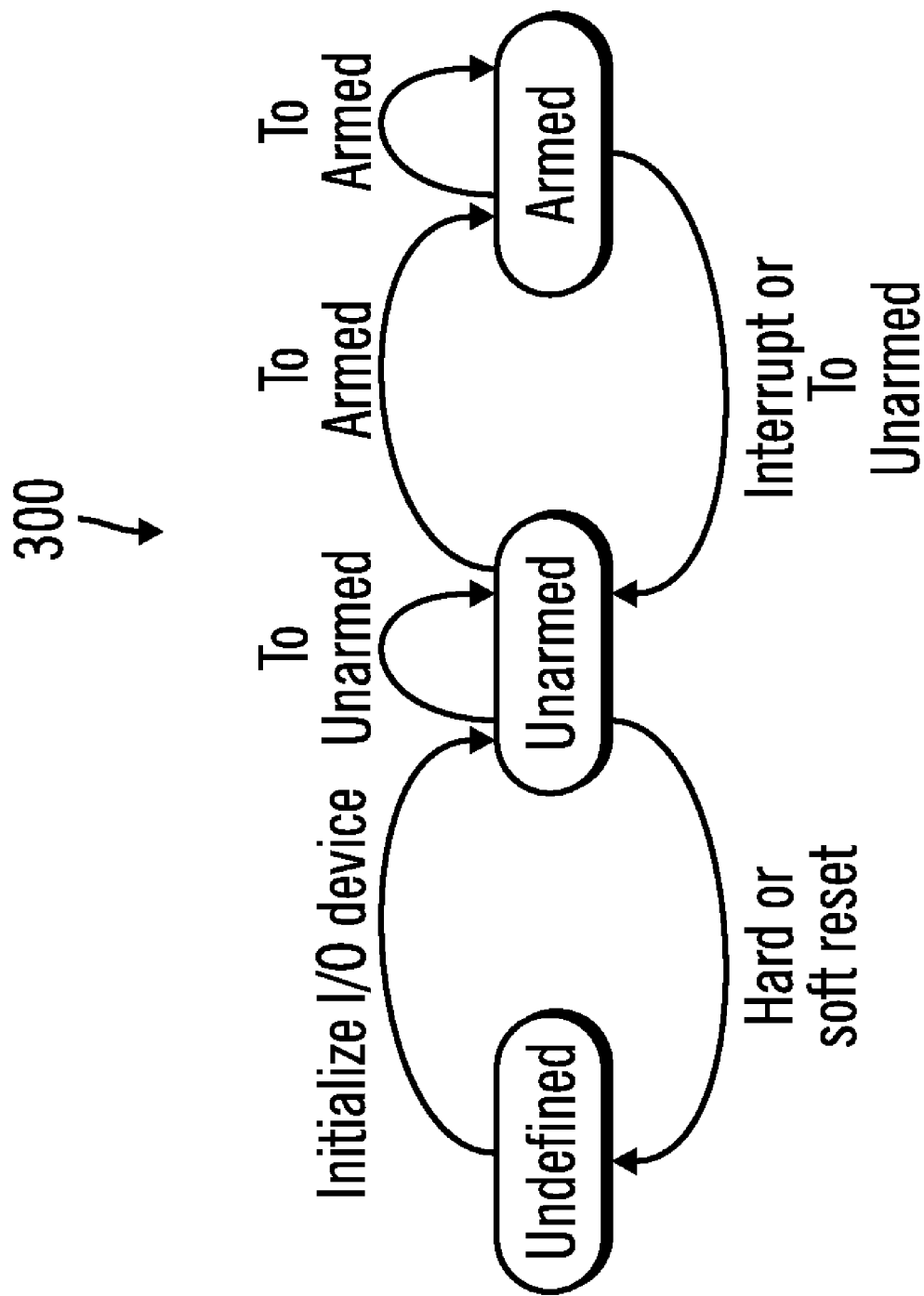
FIG. 3 illustrates a state transition diagram in accordance with certain embodiments.

FIG. 3 illustrates a state transition diagram 300 in accordance with certain embodiments. Diagram 300 shows event data structure states and state transitions. There are three states: undefined, unarmed, and armed.

The power-on default is the "undefined" state. The undefined state reflects the undefined status of the event data structure 126. If the I/O device 140 desires to post (i.e., "write") an "event" and finds the event data structure state as undefined, the I/O device 140 shuts down. The I/O device 140 may also cause the event data structure 126 to enter the undefined state if, for example, a catastrophic error is detected (e.g., event data structure overflow). In the undefined state, no event entry is written in the event data structure 126.

In the "unarmed" state, the I/O device 140 posts events to the event data structure 126 whenever desired, but the I/O device 140 does not signal an event data structure interrupt, which may be described as an interrupt signaling that an event entry has been written to the event data structure. Event data structure 126 overflows may also be detected while in the unarmed state. In certain embodiments, the event data structure 126 is large enough to avoid overflows during normal operation. In certain embodiments, upon detecting an overflow, the I/O device 140 may either shut down or signal an out-of-band event to resize the event data structure 126. Thus, if there is an overflow, the event data structure 126 may be resized. In certain embodiments, if there is an overflow, the I/O device 140 and I/O device driver 120 may switch to using a larger event data structure 126. Also, in the unarmed state, if there is a "read indicator update," the state loops back to the unarmed state.

In the "armed" state, the I/O device 140 posts events to the event data structure 126 whenever desired. However, if the write indicator 240 is already ahead, or advances ahead, of the read indicator 230 and (optionally) an interrupt moderation timer expires, the I/O device 140 signals an event data structure interrupt and transitions the event data structure state to the unarmed state. Event data structure overflows may also be detected while in the armed state.

From the undefined state, when the I/O device driver 120 allocates memory for the event data structure 126 and notifies the I/O device of the location of the event data structure 126 (illustrated as "initialize I/O device"), there is a transition to the unarmed state. From the unarmed state, when the I/O device driver 120 enables an I/O device 140 to generate interrupts, there is a transition to the armed state.

The state transition from the armed state to the unarmed state (illustrated as "Interrupt or to Unarmed") is taken simultaneously with signaling of an event data structure interrupt by an I/O device 140.

Figure 4:
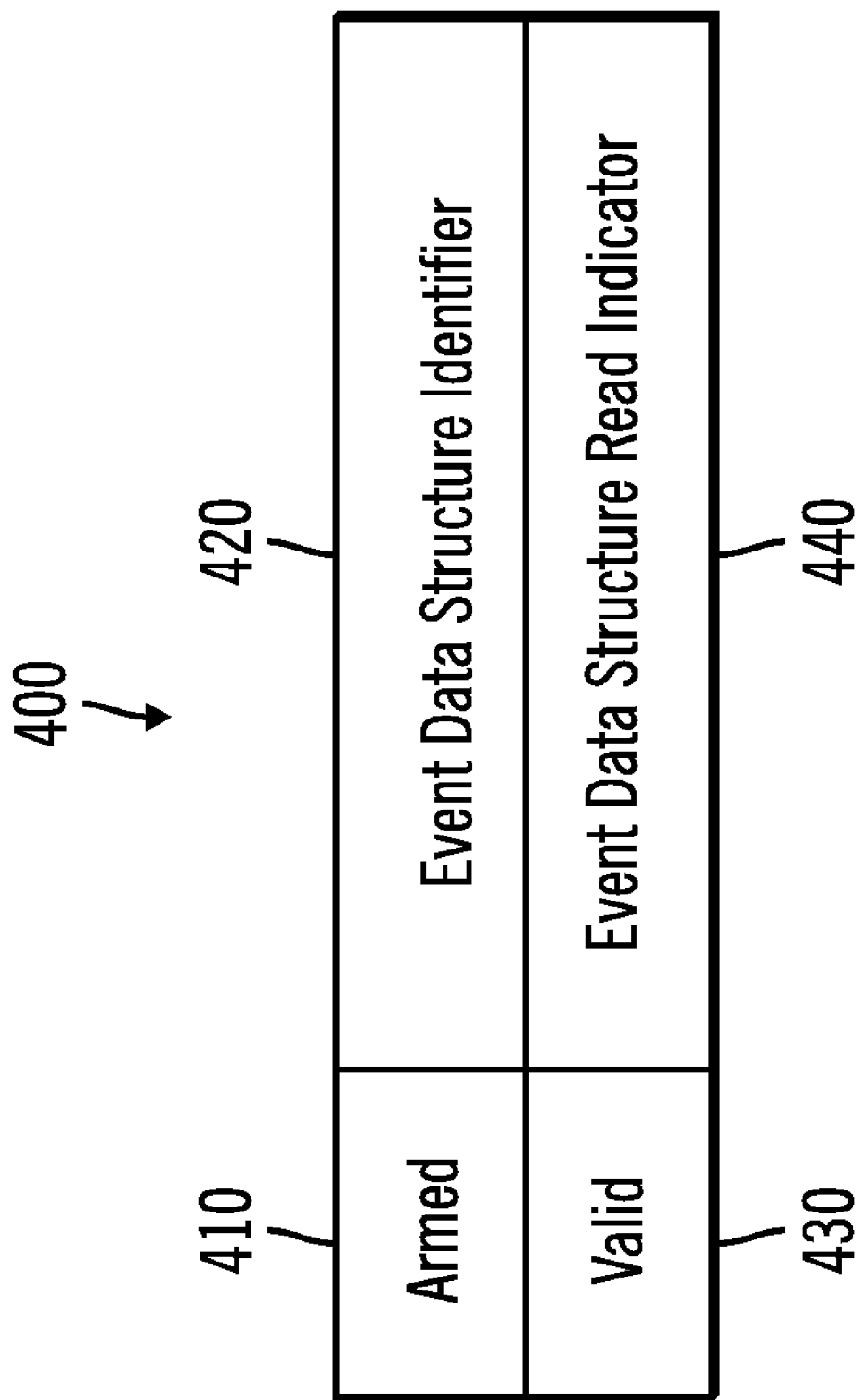
FIG. 4 illustrates a structure state indicator in accordance with certain embodiments.

The structure state indicator 150 is used by the I/O device driver 120 to communicate event data structure state transitions and the value of the read indicator 230. The structure state indicator 150 may be an I/O register maintained by the I/O device 140, which may be either memory mapped or I/O mapped. FIG. 4 illustrates a structure state indicator 400 in accordance with certain embodiments. Structure state indicator 400 is an example of a structure state indicator 150. The fields of the structure state indicator 400 are: armed, event data structure number, valid, and event data structure read indicator. The armed field 410 indicates whether the event data structure 126 should be armed or unarmed. In certain embodiments, the armed field 410 is a flag. The event data structure number field 420 provides an identifier of the event data structure 126. The valid field 430 indicates whether the event data structure read indicator is valid or not. In certain embodiments, the valid field 430 is a flag. The event data structure read indicator field 440 represents the current event data structure read indicator value. In some cases, an event entry may be read, but the read indicator may be updated at a later time, so the valid field value may be set to not valid to indicate that the value of the read indicator field is not valid.

In certain embodiments, if resizing or switching of event data structure 126 is desired, instead of updating the read indicator 230 to an absolute location, the read indicator 230 may be advanced by a number of locations. With this technique, a thread in host stack may advance the read indicator 230, while another thread is switching the event data structure 126, without acquiring any lock. With this technique, switching the event data structure 126 may be done in an atomic way through an administrative command.

During normal operation, the event data structure 126 will continuously loop between the unarmed and armed states. When the I/O device driver 120 is ready to receive an event data structure interrupt, the I/O device driver 120 arms the event data structure 126 (i.e., by setting the event data structure state to armed), and when the I/O device 140 signals an event data structure interrupt, the event data structure 126 is armed (i.e., by setting the event data structure state to unarmed). The I/O device driver 120 may implement any technique to determine when to arm the event data structure 126 (e.g., arm after one or more event entries have been read). The arming and unarming of the event data structure 125, along with proper advancement of the write indicator 240 and read indicator 230, throttles the event data structure interrupt signaling rate. Although the I/O device 140 is said to generate the event data structure interrupt, in certain embodiments, the event data structure interrupt is generated by a Remote Direct Memory Access (RDMA) Network Interface Controller (RNIC).

Certain embodiments provide polling. In particular, the event code field 202 of event entries are cleared when the event data structure 126 is created. When the I/O device driver retrieves an event from the event data structure 126, the I/O device driver clears that event entry's code field 202. The I/O device driver, instead of reading the write indicator 240, which may be costly, is able to check the next event entry's code field 202. If that code field 202 is non-zero, then the next event entry is a valid event entry. Although in certain embodiments, the code field may be zero (event entry not valid) or non-zero (event entry valid), other codes may be used to indicate whether or not an event entry is valid.

After processing that next event, the I/O device driver checks the next event entry location, and may repeat this process until finding a code field 202 with a value of zero. In this manner, more events are processed, including events posted after the interrupt, but prior to arming the event data structure 126 again). This is yet another technique of interrupt moderation.

Moreover, by using multiple event data structures 126 per I/O device 140, the events for different I/O device functions (e.g. management, TCP offload, RDMA offload, Media Access Control (MAC)) may be separated. Also, by using multiple event data structures 126 and dynamically mapping each event data structure 126 to a processor, the interrupt processing may be parallelized, and the interrupt load may be dynamically balanced. This technique may be used for both line-based (e.g., legacy PCI INTx) and Message Signal Interrupt (MSI)/MSI-X based interrupts. When multiple event data structures 126 are used with MSI-X, event data structure based interrupt processing further results in performance improvement by avoiding serialized interrupt signaling. With MSI-X and multiple event data structures 126, interrupts may be signaled in parallel.

Figure 5:
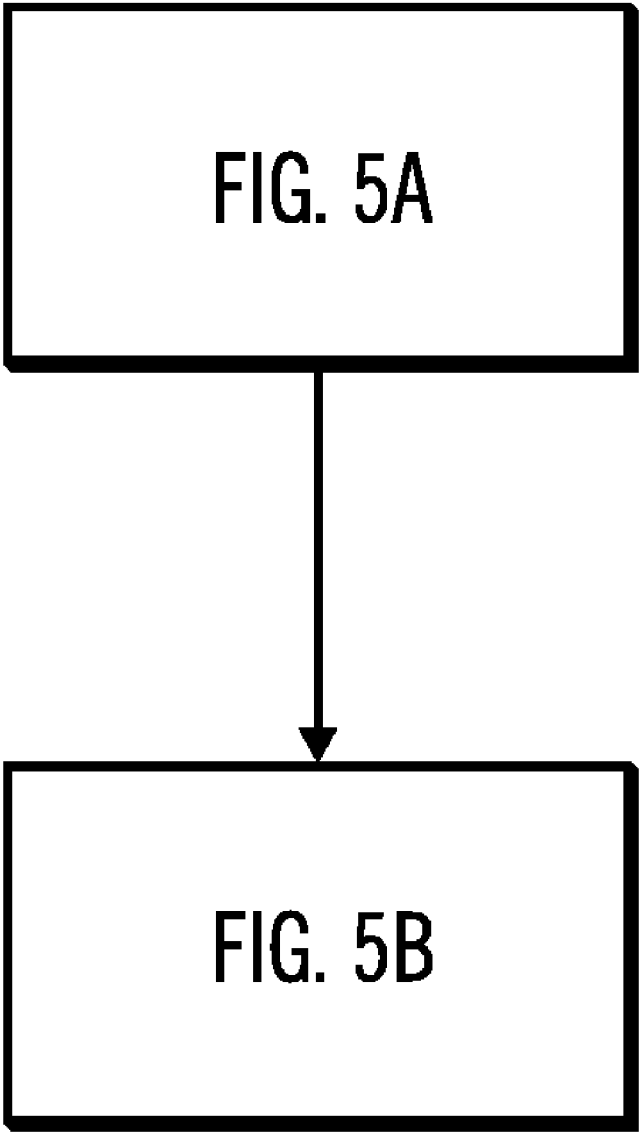
FIG. 5 illustrates a relationship between FIGS. 5A and 5B in accordance with certain embodiments.
Figure 5A:
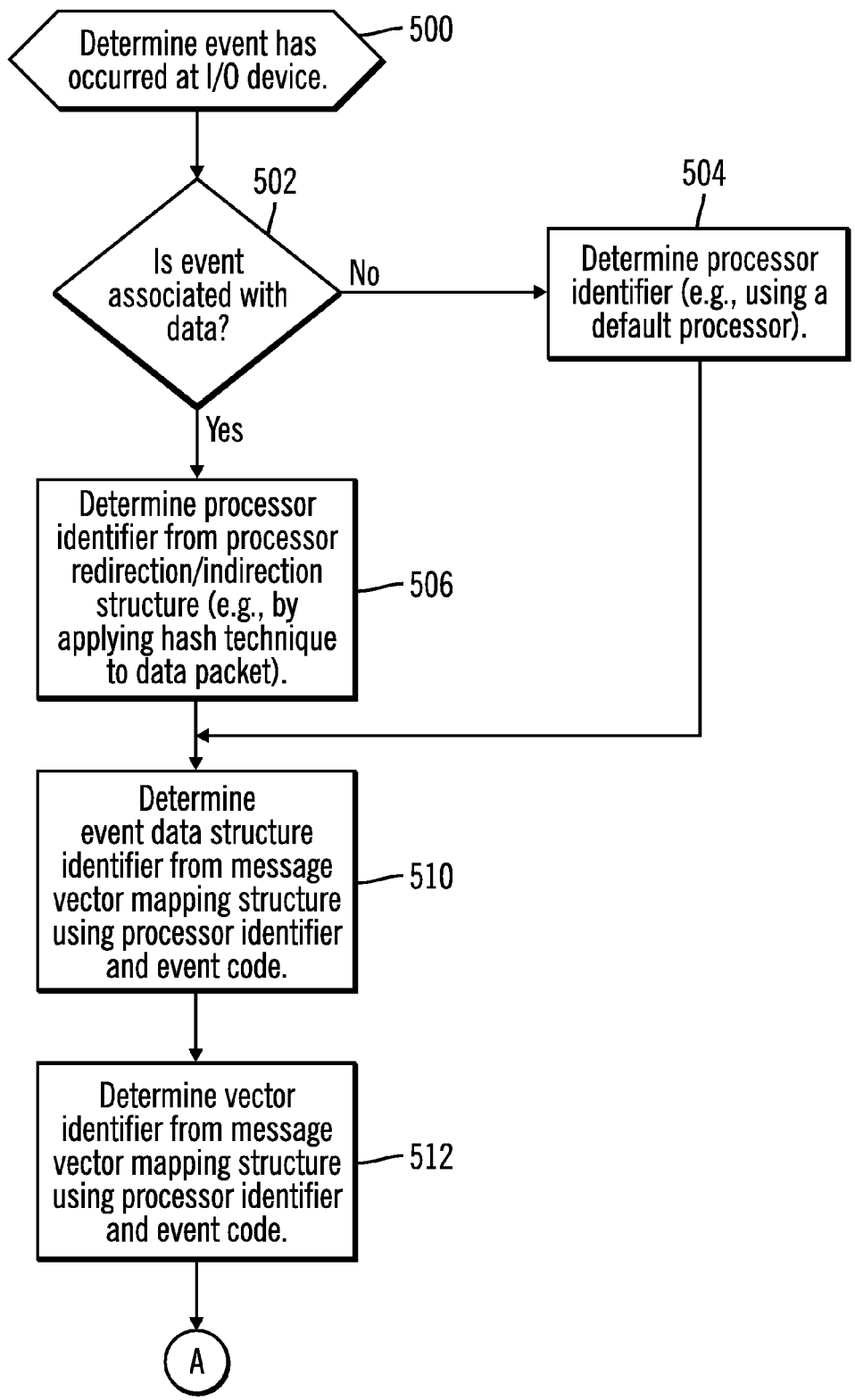
FIGS. 5A and 5B illustrate operations performed by an I/O device for processing an event in accordance with certain embodiments.
Figure 5B:
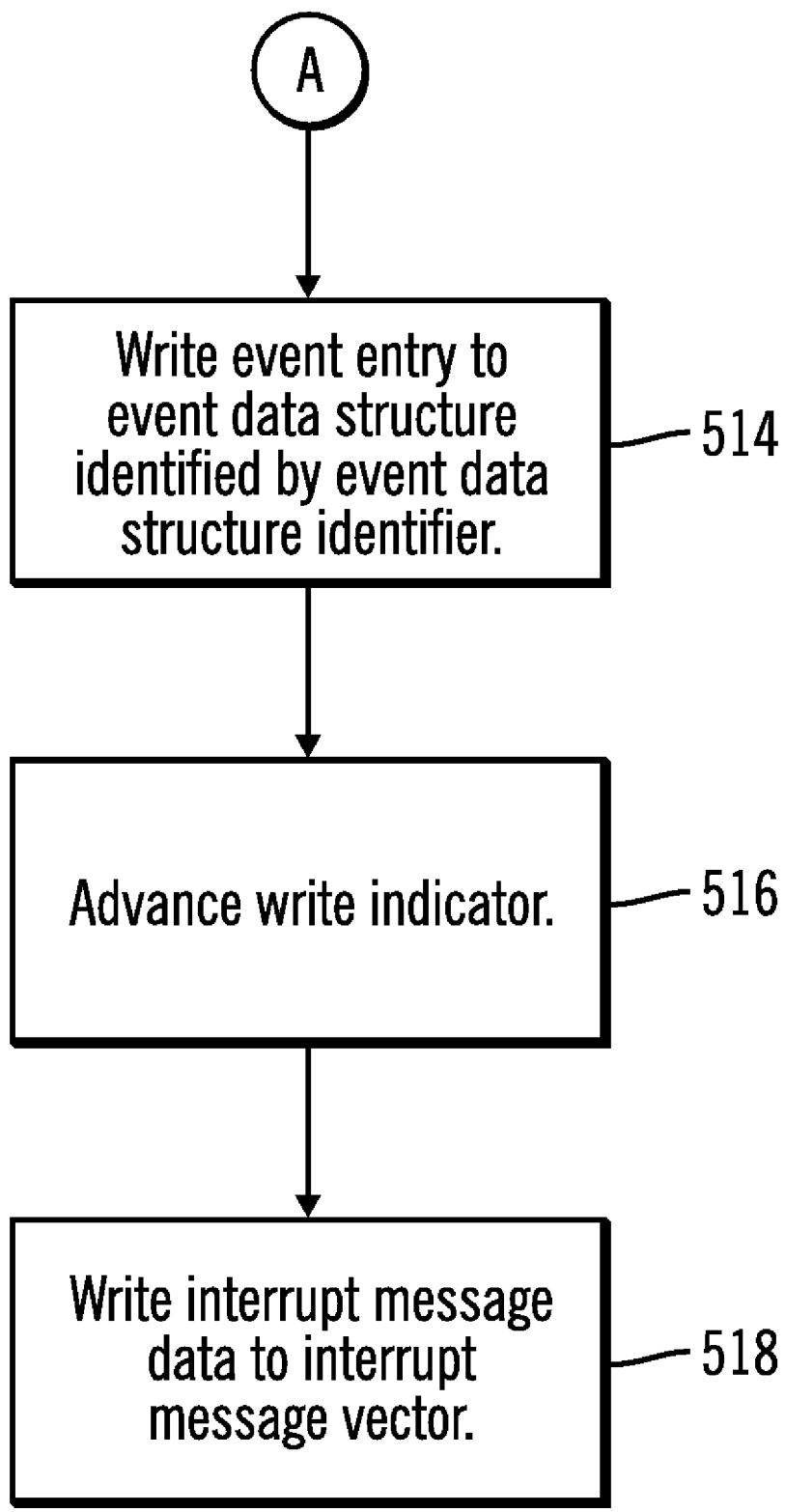

FIGS. 5A and 5B (whose relationship is shown in FIG. 5) illustrate operations performed by an I/O device 140 for processing an event in accordance with certain embodiments. In FIG. 5, it can be seen that processing may flow from FIG. 5A to FIG. 5B. Control begins at block 500 with the I/O device 140 determining that an event has occurred. In certain embodiments, the I/O device 140 writes event entries to the event data structure 126 due to the following classes of events or errors: RDMA, channel events (e.g., for native TCP TOE), global events, and management events. In certain embodiments, for global events, the I/O device 140 writes to a default (e.g., fixed) event data structure 126 (e.g., event data structure 0) with a fixed interrupt message vector (e.g., for MSI and MSI-X). In certain embodiments, for management events, the I/O device 140 writes event entries to a default event data structure 126.

Examples of RDMA events include: work request completion events, asynchronous queue pair events, asynchronous queue pair errors, completion queue errors, S-RQ limit events, S-RQ errors, and administrative command events. In certain embodiments, a specified event data structure is used for completion events or errors, while default event data structure 126 (e.g., event data structure 1) is used for other events.

Examples of channel events include: pool buffer count below threshold for a channel, descriptors are returned on a channel, and host illegally posted pool buffers on a channel. In certain embodiments, for certain events, an event data structure number from a Processor Redirection/indirection Structure (PRS) is used, while for other events, a default event data structure (e.g., event data structure 0) is used.

Examples of global events include: unrecoverable external memory Error Correcting Code (ECC) error; unrecoverable internal memory ECC/parity error; link status of MAC has changed; General Purpose I/O (GPIO) interrupts—an interrupt occurs on one of the GPIO signals; and Event Data Structure overflow notify event.

In block 502, the I/O device 140 determines whether the event is associated with a data packet. If so, processing continues to block 506, otherwise, processing continues to block 504. In block 504, the I/O device 140 determines a processor identifier (e.g., for a default processor).

Figure 6:
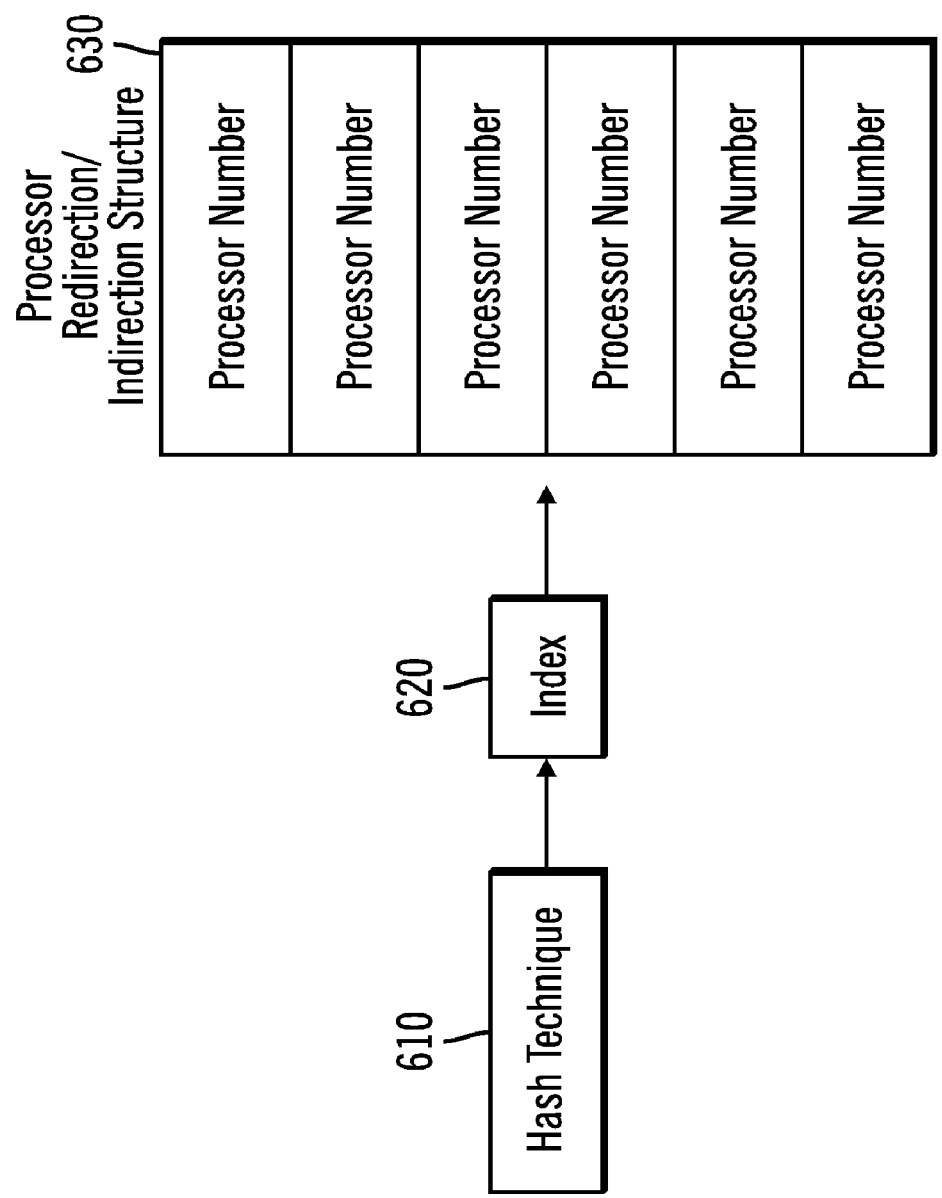
FIG. 6 illustrates use of a hash technique in accordance with certain embodiments.

In block 506, the I/O device 140 determines a processor identifier from a Processor Redirection/indirection Structure (PRS) (630 in FIG. 6). In certain embodiments, the processor redirection/indirection structure is a table. For example, in block 506, the I/O device 140 may apply a hash technique to the data packet header to identify a processor in the processor redirection/indirection structure. FIG. 6 illustrates use of a hash technique in accordance with certain embodiments. In FIG. 6, a hash technique 610 is applied to the data packet header. Inputs to the hash technique may be, for example, TCP/IPv4 (4 tuples), IPv4 (2 tuples), TCP/IPv6, IPv6 and/or a random secret key. A number of bits of the hash value output by the hash technique 610 may be used as an index 620 to access the entries (or "buckets") of a Processor Redirection or Indirection Structure (PRS) 630. Each entry may include a processor identifier (e.g., a processor number) or index. The entry and processor identifier are not one to one mapped. Thus, one processor may be mapped to multiple entries. For example, the first entry and the last entry of the PRS 630 may be associated with processor 4.

Also, if there are events (e.g., global events) that are not associated with any specific data packet, the I/O device 140 by-passes access of the PRS 630 (i.e., no hash value is computed) and a default processor may be identified (block 504) instead of using the PRS 630 to identify a processor (block 506).

In certain embodiments, the PRS 630 is initialized/updated by the I/O device driver 120 and is read by the I/O device 140. By using different techniques (e.g., different hash techniques), the PRS 630 may be expanded to cover a variety of I/O devices (i.e., storage devices), such as Network Interface Controllers (NICs) and Storage Host Bus Adapters (HBAs).

In block 510, once a processor is identified, the I/O device 140 determines an event data structure identifier (e.g., an index) from a Message Vector Mapping (MVM) structure using the processor identifier and event code. In certain embodiments, the MVM structure is a table. The I/O device 140 knows the event code. The event data structure identifier identifies a particular event data structure from among one or more event data structures. Additionally, in block 512, the I/O device 140 determines a vector identifier (also referred to as an "interrupt message/vector number") from the MVM structure using the processor identifier and event code. The vector identifier identifies a particular interrupt message vector location which may be used to generate an interrupt. If there is no valid interrupt message vector identifier, then the legacy interrupts may be used (e.g., vector identifier 0 may be reserved for legacy PCI INTx interrupts or a flag indicating whether a vector identifier is valid may be used for generating legacy interrupts.).

FIG. 7 illustrates an example Message Vector Mapping (MVM) structure 700 in accordance with certain embodiments. The MVM structure 700 has a column for a function/event code 710 and columns for each process (e.g., column 720 for processor 0). For each function/event code (e.g., RDMA), and for each processor, an event data structure identifier 730 and a vector identifier 740 are provided. The event data structure identifier 730 identifies a particular event data structure. The vector identifier 740 identifies a particular interrupt message vector into which the I/O device 140 may store data (e.g., the interrupt message) for access by the I/O device driver 120. The interrupt message may include, for example, an event code. In certain embodiments, the interrupt message vector is located in PCI address space. In certain embodiments, each event data structure may be associated with one or more interrupt message vectors.

The MVM structure provides flexibility because an I/O device driver 120 may initialize the MVM structure, while an I/O device 140 reads the MVM structure. The MVM structure handles a dynamic number of processors, event data structures, and allocated messages from an operating system. The MVM structure also handles the physical interrupt mechanism properly (e.g., INTx#, MSI or MSI-X)

For events (e.g., global events) that are not associated with a PRS 630, the I/O device 140 uses a processor identifier of a default processor and the event code to locate the event data structure identifier 730 and vector identifier 740 in the MVM structure 700.

From block 512, processing continues to block 514 (FIG. 5B). In block 514, the I/O device 140 writes an event entry to the event data structure identified by the event data structure identifier. In block 516, the I/O device 140 advances a write indicator. The write indicator may be advanced using a lazy update (i.e., the write indicator is updated at a later time than the time at which the event data structure 126 is updated): In block 518, the I/O device 140 writes interrupt message data (i.e., and interrupt message) to an interrupt message vector to generate an interrupt.

The I/O device driver 120 may configure the MVM structure depending on the available system resources and performance criteria. For example, in certain embodiments, there is one event data structure and no interrupt message vector for all processors (e.g., for INTx# interrupt mechanisms). In certain embodiments, there is one event data structure per processor and no interrupt message vector for all processors. In certain embodiments, there is one event data structure per function and no interrupt message vector for all processors. In certain embodiments, there is one event data structure per function per processor and no interrupt message vector for all processors.

In certain embodiments, there is one event data structure and one interrupt message vector for all processors. In certain embodiments, there is one event data structure for all processors and one interrupt message vector per processor. In certain embodiments, there is one event data structure per processor and one interrupt message vector for all processors. In certain embodiments, there is one event data structure and one interrupt message vector per processor.

In certain embodiments, there is one event data structure and one or more interrupt message vectors per processor. In certain embodiments, there are multiple event data structures and multiple interrupt message vectors per processor. In certain embodiments, there is one interrupt message vector for multiple event data structures.

In certain embodiments, there is one event data structure per function and one interrupt message vector for all processors. In certain embodiments, there is one event data structure per function and one interrupt message vector per processor. In certain embodiments, there is one event data structure and one interrupt message vector per function. In certain embodiments, there is one event data structure per function per processor and one interrupt message vector for all processors. In certain embodiments, there is one event data structure per function per processor and one interrupt message vector per processor. In certain embodiments, there is one event data structure per function per processor and one interrupt message vector per function. In certain embodiments, there is one event data structure and one interrupt message vector per function per processor.

FIG. 8 illustrates an alternative example Message Vector Mapping (MVM) structure 850 in accordance with certain embodiments. In FIG. 8, the MVM structure 850 has a column for a function/event code 860 and columns for each process (e.g., column 870 for processor 0). For each sub-function/event code (e.g., RDMA TX (i.e., RDMA transfer) or RDMA RX (i.e., RDMA receive)), and for each processor, an event data structure identifier 880 and a vector identifier 890 are provided. Thus, the rows of the MVM structure 850 can be increased to include more sub-functions for operating systems or interrupt service routines that desire to work with the sub-functions. In the example of FIG. 8, multiple event data structures and/or interrupt message vectors are supported within a single function (e.g., RDMA).

Figure 9:
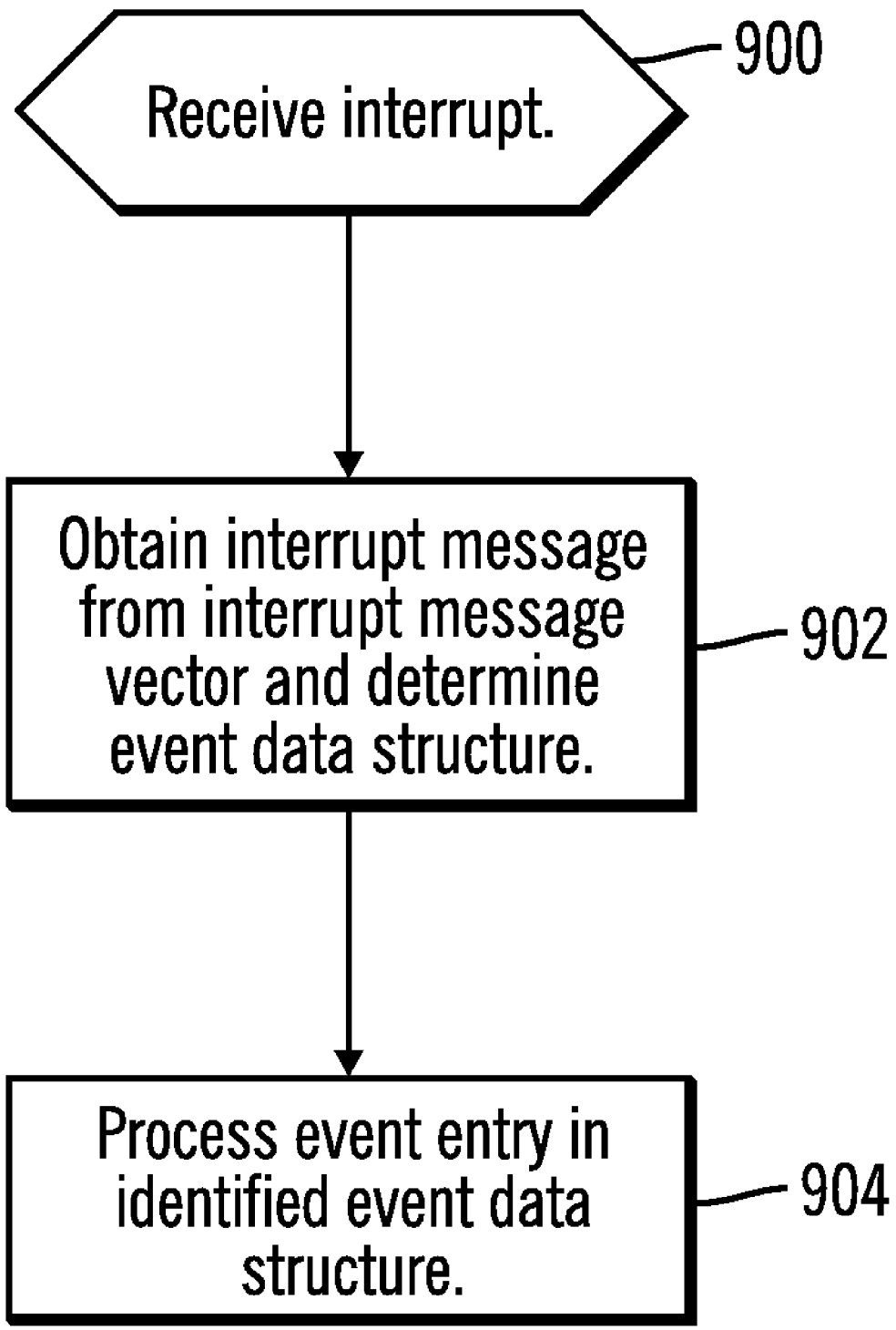
FIG. 9 illustrates operations performed by an I/O device driver in accordance with certain embodiments.

FIG. 9 illustrates operations performed by an I/O device driver 120 in accordance with certain embodiments. Control begins at block 900 with the I/O device driver 120 receiving an interrupt. The interrupt may be caused by the I/O device 140 writing interrupt message data into an interrupt message vector. In block 902, the I/O device driver 120 obtains an interrupt message in an interrupt message vector and determines an event data structure. In block 904, the I/O device driver processes an event entry in the identified event data structure.

In certain embodiments, the event data structure manager 151 is invoked by other components of I/O device 140, and these other components may be referred to as "clients." Each client is responsible for generating an event entry and an event data structure index and for routing the event entry and event data structure index to the event data structure manager 151. For a channel event, the channel number may be encoded inside the event code of the event entry. For a global event, clients may interface with the event data structure manager 151 with an electrical signal, and the event data structure entry 151 then converts the electrical signal to a proper event code. For global events, the client uses a default event data structure identifier entry of the MVM structure and bypasses hash computations. The event code in the event data structure entry identifies a function (e.g. an RDMA or channel event).

Figure 10:
FIG. 10 illustrates a relationship between FIGS. 10A and 10B in accordance with certain embodiments.
Figure 10A:
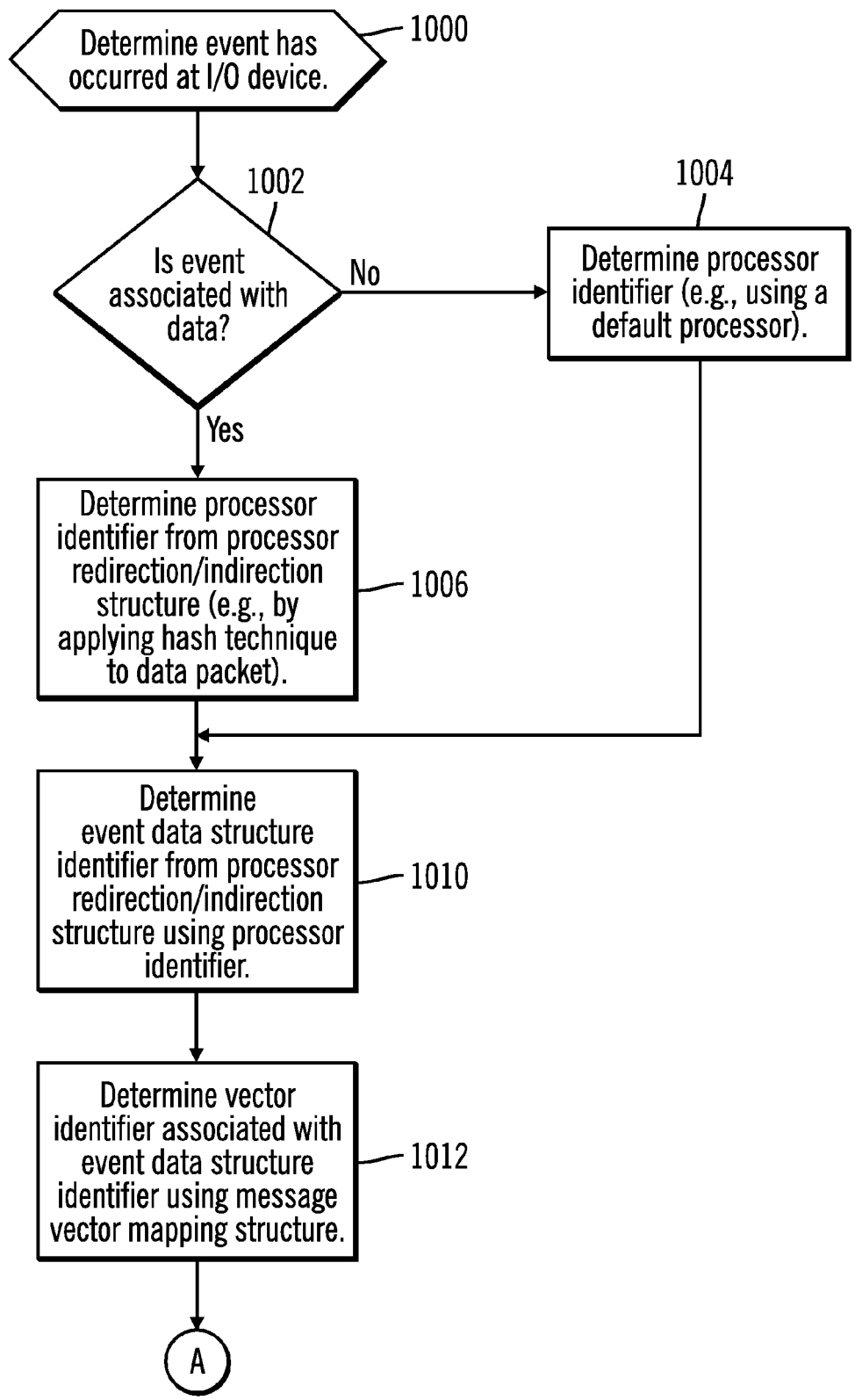
FIGS. 10A and 10b illustrate operations performed by an I/O device for processing an event in accordance with certain alternative embodiments.
Figure 10B:
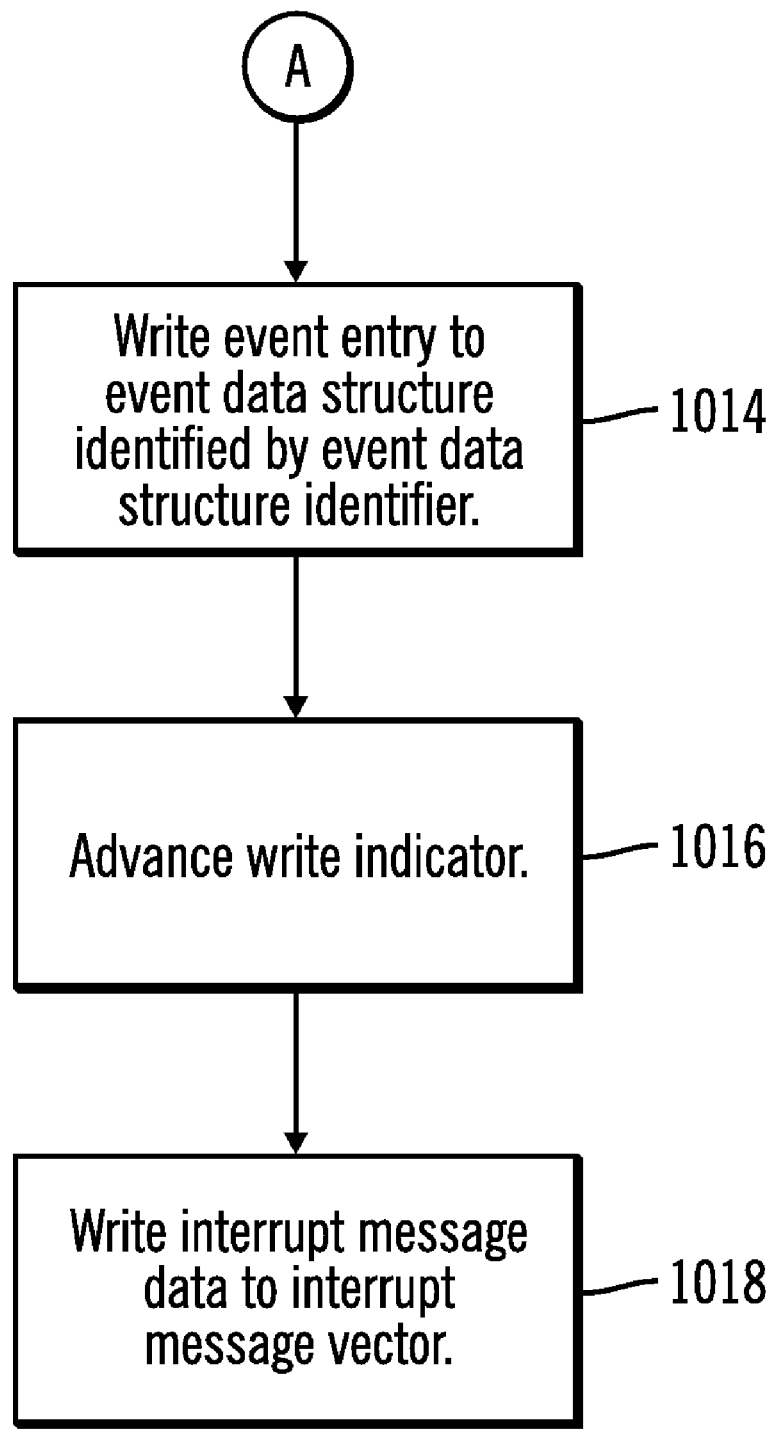

FIGS. 10A and 10b (whose relationship is shown in FIG. 10) illustrate operations performed by an I/O device 140 for processing an event in accordance with certain alternative embodiments. In FIG. 10, it can be seen that processing may flow from FIG. 10A to FIG. 10B. Control begins at block 1000 with the I/O device 140 determining that an event has occurred. In certain embodiments, the I/O device 140 writes event entries to the event data structure 126 due to the following classes of events or errors: RDMA, channel events (e.g., for native TCP), global events, and management events.

In block 1002, the I/O device 140 determines whether the event is associated with data. If so, processing continues to block 1006, otherwise, processing continues to block 1004. In block 1004, the I/O device 140 determines a processor identifier (e.g., for a default processor). That is, some events (e.g., global events) are not associated with a specific data packet, and these events do not use a processor redirection/indirection structure and a default event data structure (e.g., event data structure 0) is used to post event entries for such events.

Figure 11:
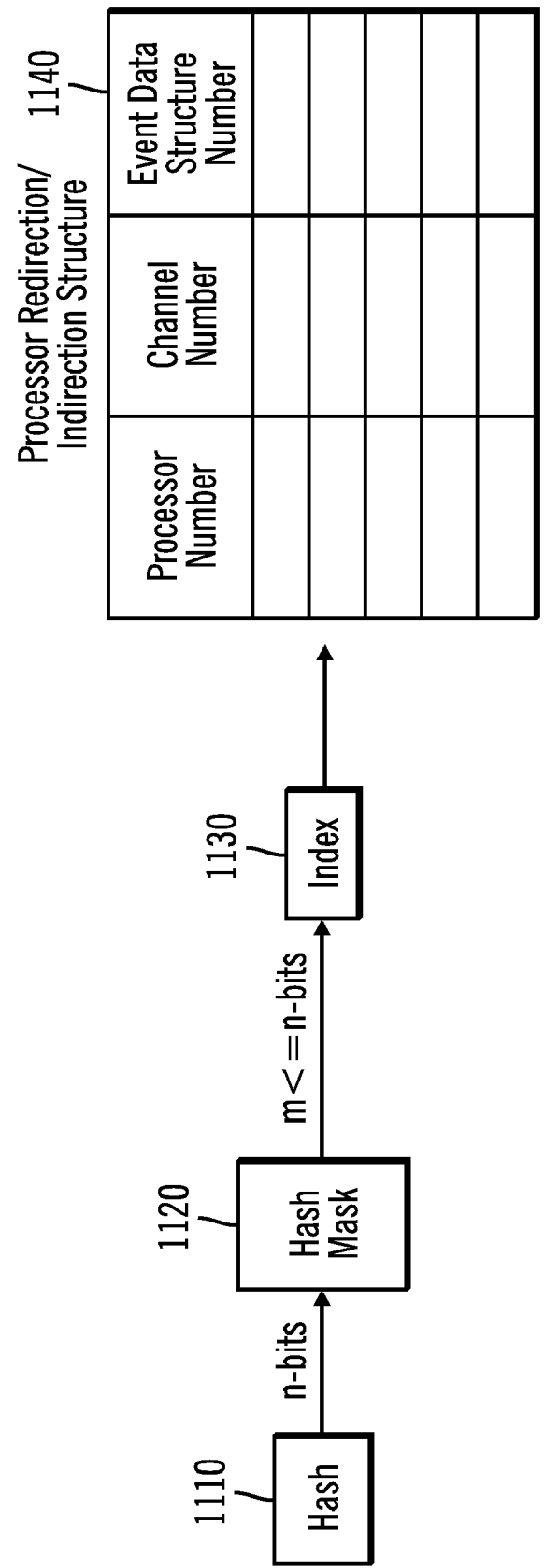
FIG. 11 illustrates use of a hash technique in accordance with certain alternative embodiments.

In block 1006, the I/O device 140 determines a processor identifier from a processor redirection/indirection structure. For example, in block 1006, the I/O device 140 may apply a hash technique to the data packet header to identify a processor in the processor redirection/indirection structure. For example, in block 1006, the I/O device 140 may apply a hash technique to the data packet header. FIG. 11 illustrates use of a hash technique in accordance with certain alternative embodiments. In FIG. 11, a hash technique 1110 is applied to a data packet header. Inputs to the hash technique may be TCP/IPv4 (4 tuples), IPv4 (2 tuples), TCP/IPv6, IPv6 and/or a random secret key (e.g., 40 bytes from the operating system at boot time). A hash mask 1120 may be applied to the n-bit (e.g., 32 bit) value output by the hash technique 1110, which results in a m<=n-bit index (e.g., an 8-bit index) 1130 that is used to access the PRS 1140.

In certain embodiments, the PRS 1140 entries are specified by using Configuration and Status Registers (CSRs). The different fields of CSRs represent the processor number, channel number, and event data structure number. For example, a hash mask 1120 may be stored in a separate CSR, and a 40-byte hash secret key is stored using 10 CSRs. At the time of initialization, the host stack 105 provides the CPU IDs for the indirection structure, indirection structure size, and the hash secret key. The I/O device driver 120 initializes the PRS 1140, hash secret key, and the hash mask 1120. The host stack 105 may update CPU IDs of the PRS 1140 and the hash secret key. These updates are handled by the I/O device driver 120 by writing to appropriate CSR(s).

The channel number is valid for channel events. The table index/entry and processor are not one-to-one mapped, and one processor may be mapped to multiple indexes/entries. The event data structure identifier number is for channel events and is used as an index to a MVM structure to locate a vector identifier. In certain embodiments, the hash technique may combine a random secret key with the data packet header tuples. The PRS 1140 is accessed for channel or native TCP events, and the RDMA does not use the PRS 1140. In certain embodiments, the PRS 1140 is initialized by the I/O device driver 120 and is read by the I/O device 140.

In block 1010, once a processor is identified, the I/O device 140 determines an event data structure identifier from the PRS 1140 using the processor identifier. In block 1012, the I/O device 140 determines a vector identifier from a MVM structure using the event data structure identifier as an index to the MVM structure.

Figure 12:
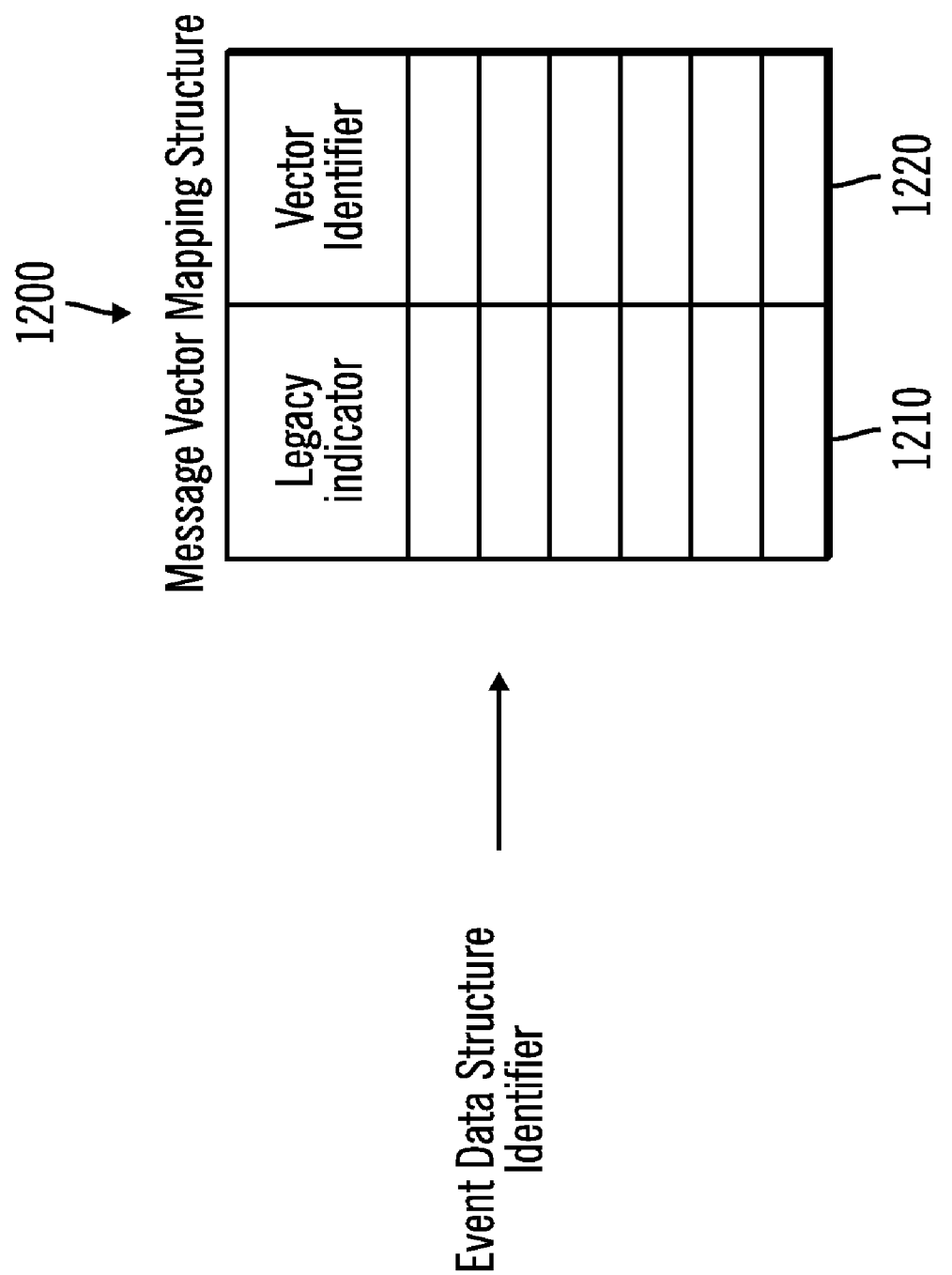
FIG. 12 illustrates an example Message Vector Mapping (MVM) structure in accordance with certain alternative embodiments.

FIG. 12 illustrates an example Message Vector Mapping (MVM) structure 1200 in accordance with certain alternative embodiments. The MVM structure 1200 has a column for a legacy indicator (e.g., a bit) 1210 and a column for a vector identifier (e.g., 5 bits) 1220. The event data structure identifier points to an entry with vector information. The legacy indicator indicates whether an entry is a legacy INTx# or not. If not, the vector identifier gives the vector identifier for MSI or MSI-X use.

Thus, once an event data structure identifier is identified from the PRS 1140 or from other functional blocks (e.g., RDMA blocks), the event data structure manager 151 locates a vector identifier from the Message Vector Mapping (MVM) structure.

For events (e.g., global events) that are not associated with a PRS 1140, the I/O device 140 uses a default event data structure (e.g., event data structure 0) to locate a vector identifier in the MVM structure 1200.

From block 1012, processing continues to block 1014 (FIG. 10B). In block 1014, the I/O device 140 writes an event entry to the event data structure identified by the event data structure identifier. In block 1016, the I/O device 140 advances a write indicator. The write indicator may be advanced using a lazy update (i.e., the write indicator is updated at a later time than the time at which the event data structure 126 is updated). In block 1018, the I/O device 140 writes interrupt message data to an interrupt message vector to generate an interrupt.

Thus embodiments provide the use of system memory resident (virtually contiguous) event data structures for communicating event information. The I/O device performs a write into an event data structure to provide event information instead of the I/O device driver performing an I/O read to obtain interrupt information. By reading event data structure entries, the I/O device driver is able to determine the I/O device that generated the interrupt and the cause of the interrupt. Therefore, use of the event data structure based interrupt processing scheme eliminates the I/O read operation for reading the cause of an interrupt cause as the event information is written by the I/O device in the system memory resident event data structure.

Embodiments transparently and flexibly handle I/O device interrupts to different processors with different interrupt message vectors, regardless of how an operating system allocates these resources, while allowing multiple event data structures for various optimization opportunities (e.g., interrupt moderation or latency requirements).

Also, the I/O device driver is able to control the interrupt rate by using the arming/disarming mechanism of the event data structure. This allows interrupt coalescing/moderation to be controlled by the I/O device driver instead of the I/O device. This results in better interrupt coalescing/moderation mechanism as the driver has a better view of system load at any given time.

By using multiple event data structures per I/O device, the events for different I/O device functions (e.g. management, TCP offload, RDMA offload, MAC) may be separated. Moreover, the event data structure based mechanism scales well with the system memory and processors. In particular, the event data structure size is dependent on the amount of system memory resources available and multiple event data structures may be used to parallelize interrupt processing. By using multiple event data structures and dynamically mapping each event data structure to a processor, the interrupt processing may be parallelized and the interrupt load can be dynamically balanced.

With embodiments of the interrupt scheme, the I/O device 140 handles INTx#, MSI or MSI-X transparently, manage event data structure states, handles fewer or more interrupt message vectors allocated by the operating system than by a request for MSI or MSI-X, does not drop interrupt events. Also, the interrupt scheme tolerates spurious interrupts, handles multiple event data structures transparently, and adapts interrupt moderation separately for each event data structure.

Embodiments provide better system performance by eliminating expensive MMIO reads and some MMIO writes for each interrupt that is handled. Also, embodiments are capable of transparently handling existing and future INTx#, MSI and MSI-X standards. Embodiments work seamlessly with receive optimization, such as Receive Side Scaling (RSS) from Microsoft Corporation, to load balance receive interrupts in a multi-processor system. Embodiments also handle multiple event data structures to further optimize system performance.

Embodiments enable building I/O devices, such as MAC/TOE/RNIC, and offer a high-performance interrupt processing scheme. The scheme may be used for various interrupts, such as I/O device-to-processor, controller-to-processor, processor-to-processor, chipset-to-processor interrupts.

ADDITIONAL EMBODIMENT DETAILS

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

The illustrated operations of FIGS. 5A, 5B, 8, 9A, and 9B show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for interrupt processing, comprising:
   determining that an event has occurred;
   determining a processor identifier;
   determining an event data structure identifier for an event data structure into which data for the event is stored using the processor identifier, wherein the event data structure identifier is determined by accessing a message vector mapping structure using the processor identifier and an event code;
   determining a vector identifier for an interrupt message vector; and
   writing interrupt message data to the interrupt message vector to generate an interrupt.

2. The method of claim 1, wherein the processor identifier is determined by applying a hash technique to a data packet to access a processor redirection/indirection structure.

3. The method of claim 1, wherein the vector identifier is determined by accessing a message vector mapping structure using the processor identifier and an event code.

4. The method of claim 1, further comprising:
   writing an event entry to the event data structure identified by the event data structure identifier; and
   advancing a write indicator.

5. The method of claim 1, further comprising:
   receiving an interrupt;
   identifying an event data structure using the interrupt message data in the interrupt message vector; and
   processing an event entry in the identified event data structure.

6. The method of claim 1, further comprising:
   determining whether the event is associated with data; and
   determining a default processor identifier in response to determining that the event is not associated with data.

7. A method for interrupt processing, comprising:
   determining that an event has occurred;
   determining a processor identifier;
   determining an event data structure identifier for an event data structure into which data for the event is stored using the processor identifier;
   determining a vector identifier for an interrupt message vector, wherein the vector identifier is determined from a message vector mapping structure using the event data structure identifier as an index; and
   writing interrupt message data to the interrupt message vector to generate an interrupt.

8. The method of claim 7, wherein the event data structure identifier is determined by accessing a processor redirection/indirection structure using the processor identifier.

9. A system for interrupt processing, comprising:
   an Input/Output device coupled to a Network Interface Controller bus; and
   circuitry at the Input/Output device operable to:
     determine that an event has occurred;
     determine a processor identifier from a processor redirection/indirection structure;
     determine an event data structure identifier for an event data structure into which data for the event is stored using the processor identifier, wherein the event data structure identifier is determined by accessing a message vector mapping structure using the processor identifier and an event code;
     determine a vector identifier for an interrupt message vector into which an interrupt message is written; and
     write interrupt message data to the interrupt message vector to generate an interrupt.

10. The system of claim 9, wherein the processor identifier is determined by applying a hash technique to a data packet to access a processor redirection/indirection structure.

11. The system of claim 9, wherein the vector identifier is determined by accessing a message vector mapping structure using the processor identifier and an event code.

12. The system of claim 9, wherein the circuitry is operable to:
    write an event entry to the event data structure identified by the event data structure identifier; and
    advance a write indicator.

13. The system of claim 9, further comprising:
    an Input/Output device driver coupled to a bus; and
    circuitry at the Input/Output device driver operable to:
      receive an interrupt;
      identify an event data structure using the interrupt message data in the interrupt message vector; and
      process an event entry in the identified event data structure.

14. The system of claim 9, wherein the circuitry is operable to:
- determine whether the event is associated with data; and
- determine a default processor identifier in response to determining that the event is not associated with data.

15. A system for interrupt processing, comprising:
- an Input/Output device coupled to Network Interface Controller a bus; and
- circuitry at the Input/Output device operable to:
  - determine that an event has occurred;
  - determine a processor identifier from a processor redirection/indirection structure;
  - determine an event data structure identifier for an event data structure into which data for the event is stored using the processor identifier;
  - determine a vector identifier for an interrupt message vector into which an interrupt message is written, wherein the vector identifier is determined from a message vector mapping structure using the event data structure identifier as an index; and
  - write interrupt message data to the interrupt message vector to generate an interrupt.

16. The system of claim 15, wherein the event data structure identifier is determined by accessing a processor redirection/indirection structure using the processor identifier.

17. An article of manufacture for interrupt processing, wherein the article of manufacture is at an Input/Output device and is operable to:
- determine that an event has occurred;
- determine a processor identifier from a processor redirection/indirection structure;
- determine an event data structure identifier for an event data structure into which data for the event is stored using the processor identifier, wherein the event data structure identifier is determined by accessing a message vector mapping structure using the processor identifier and an event code;
- determine a vector identifier for an interrupt message vector into which an interrupt message for the event is stored; and
- write interrupt message data to the interrupt message vector to generate an interrupt.

18. The article of manufacture of claim 17, wherein the processor identifier is determined by applying a hash technique to a data packet to access a processor redirection/indirection structure.

19. The article of manufacture of claim 17, wherein the vector identifier is determined by accessing a message vector mapping structure using the processor identifier and an event code.

20. The article of manufacture of claim 17, wherein the article of manufacture is operable to:
- write an event entry to the event data structure identified by the event data structure identifier; and
- advance a write indicator.

21. The article of manufacture of claim 17, wherein the Input/Output device is connected to a device driver and wherein an article of manufacture at the Input/Output device driver is operable to:
- receive an interrupt;
- identify an event data structure using the interrupt message data in the interrupt message vector; and
- process an event entry in the identified event data structure.

22. The article of manufacture of claim 21, wherein the article of manufacture is operable to:
- determine whether the event is associated with data; and
- determine a default processor identifier in response to determining that the event is not associated with data.

23. An article of manufacture for interrupt processing, wherein the article of manufacture is at an Input/Output device and is operable to:
- determine that an event has occurred;
- determine a processor identifier from a processor redirection/indirection structure;
- determining an event data structure identifier for an event data structure into which data for the event is stored using the processor identifier;
- determining a vector identifier for an interrupt message vector into which an interrupt message for the event is stored, wherein the vector identifier is determined from a message vector mapping structure using the event data structure identifier as an index; and
- writing interrupt message data to the interrupt message vector to generate an interrupt.

24. The article of manufacture of claim 23, wherein the event data structure identifier is determined by accessing processor redirection/indirection structure using the processor identifier.

* * * * *

UNITED STATES PATENT AND TRADEMARK OFFICE
CERTIFICATE OF CORRECTION

PATENT NO. : 7,197,588 B2
APPLICATION NO. : 10/816435
DATED : March 27, 2007
INVENTOR(S) : Gary Y. Tsao, Hemal V. Shah and Gregory D. Cummings It is certified that error appears in the above-identified patent and that said Letters Patent is hereby corrected as shown below:

Column 15, Lines 7-8, delete "to Network Interface Controller a bus" and replace with --to a Network Interface Controller bus--.

Column 16, Line 30, delete "determining" and replace with --determine--.

Column 16, Line 33, delete "determining" and replace with --determine--.

Column 16, Line 38, delete "writing" and replace with --write--.

Signed and Sealed this

Twenty-ninth Day of September, 2009

David J. Kappos
*Director of the United States Patent and Trademark Office*